Aug. 14, 1956  J. C. WRENN  2,759,181
MULTIVIBRATORS WITH SLOW RECOVERY TIMES
Filed Oct. 24, 1952
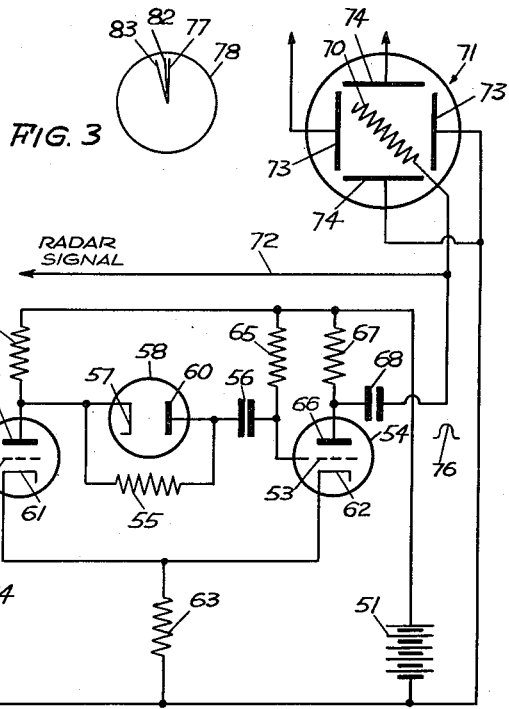
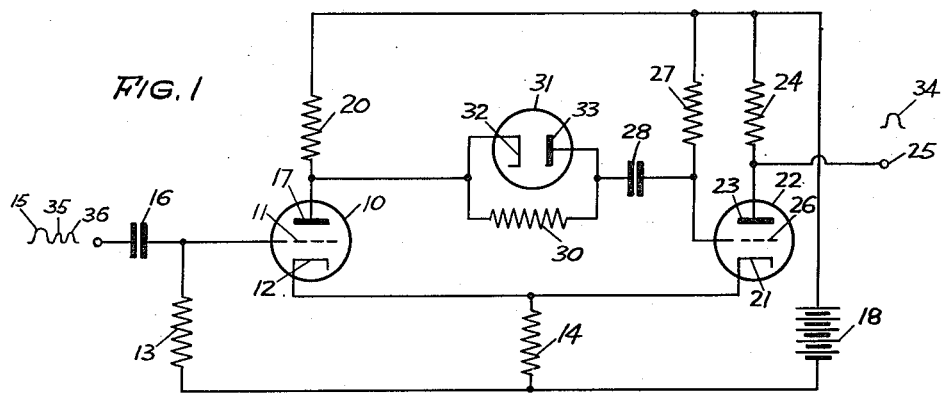
INVENTOR
JOHN C. WRENN
BY Elmer J. Gorn
ATTORNEY

United States Patent Office 2,759,181
Patented Aug. 14, 1956

2,759,181

MULTIVIBRATORS WITH SLOW RECOVERY TIMES

John C. Wrenn, Newton, Mass., assignor to Raytheon Manufacturing Company, Newton, Mass., a corporation of Delaware Application October 24, 1952, Serial No. 316,587

4 Claims. (Cl. 343—16)

This invention relates to multivibrators with slow recovery times, and more particularly to such multivibrators as utilized in radar sets and other echo-ranging equipment to give an indication of the ship's heading with respect to the other information presented.

In certain applications of monostable multivibrators, it is desirable that, for a predetermined time immediately folowing a triggering pulse, any spurious triggers that may occur during this period be prevented from triggering off the multivibrator to give an undesired pulse. One such application is in a ship's heading flash circuit for a marine radar. In such circuits, a pulse is produced each time the radar antenna rotates past an angular position coinciding with or parallel to the ship's axis or any other reference direction. This pulse is used to brighten the beam on a plan position indicator type of cathode ray tube presentation to give an indication of the ship's heading with respect to the other information presented. In a representative equipment of this type, the trigger is produced by a switch operated by the rotating shaft that drives the antenna. It has been found in operation that such a switch may chatter and produce more than one trigger with the result that several false heading indications may appear immediately following the desired one. Such spurious indications have been suppressed by a second pulse triggered by the mark-producing means, as more fully described in the United States Patent No. 2,517,635, issued August 8, 1950, to Darden et al.

By the present invention, this purpose is accomplished in a simpler manner by modifying the coupling circuit between the plate of the normally nonconducting tube of a multivibrator and the grid of the normally conducting tube. This modified coupling circuit comprises an impedance and a capacitor connected in series with a diode connected across the impedance with such a polarity as to provide a low impedance discharge path and a high impedance charging path for the capacitor. The charging path has a sufficiently long time constant to prevent a second triggering pulse being effective to retrigger the multivibrator for a predetermined interval after an initial pulse.

This circuit can be introduced into any monostable multivibrator to assure that it will not respond to any triggering pulse occurring for a predetermined time after an output pulse has been produced.

Other and further advantages of this invention will be apparent as the description thereof progresses, reference being had to the accompanying drawings wherein:

Fig. 1 is a schematic diagram of the circuit of an embodiment of the multivibrator of the invention;

Fig. 2 is the circuit of Fig. 1 incorporated into a ship's heading indicator circuit; and Fig. 3 is a view of the display on the cathode ray tube face of the ship's heading indicator circuit of Fig. 2.

In Fig. 1, the reference numeral 10 designates a normally nonconducting tube of a multivibrator. The grid 11 of this tube is connected to the cathode 12 through resistors 13 and 14. An input trigger pulse of the wave form 15 is coupled to the grid 11 through a capacitor 16. The plate 17 is connected to a source 18 of positive potential through resistor 20. The cathode 12 is also connected to the cathode 21 of the normally conducting tube 22 of the multivibrator. The plate 23 of this tube is connected to the source 18 of positive potential through a resistor 24 and to the output terminal 25. The grid 26 of the tube 22 is connected to the source 18 of positive potential through a resistor 27. The grid 26 is also coupled to the plate 17 of the tube 10 through a capacitor 28 and a resistor 30. A diode 31 is connected across the resistor 30 with its cathode 32 connected to the plate 17 of the tube 10 and its plate 33 connected to the capacitor 28.

In operation, upon the appearance of a trigger pulse 15 at the grid 11 of tube 10, this normally nonconducting tube conducts. As the potential on its plate 17 drops, the diode 31 conducts, driving the grid 26 of the normally conducting tube 22 negative, cutting it off and raising the potential of its plate 23 to cause a positive pulse of wave form 34 to appear at the output terminal 25. At the end of the pulse 15, the capacitor 28 commences to discharge and is discharged when the grid 26 of tube 22 reaches the cutoff point at which time it starts to recharge through the resistor 30. While the capacitor 28 is discharged, the plate 33 of the diode 31 is not at a sufficiently positive potential with respect to its cathode 32 for it to conduct until the capacitor 28 is recharged. Thus, once the multivibrator has been triggered, it cannot be triggered again during an interval of time determined by the time it takes to charge and recharge the capacitor 28 through the resistor 30. This is the recovery time and can be made relatively long with respect to the discharging time. Hence, the multivibrator of this invention may be said to have a slow recovery time. This slow recovery time prevents any spurious pulses, such as pulses 35 and 36, that may occur during a predetermined interval following the desired triggering pulse 15 from triggering the multivibrator and giving an undesired pulse.

Fig. 2 illustrates the use of the circuit of the invention in a ship's heading flasher circuit. In Fig. 2, the reference numeral 40 designates a cam driven by the same shaft 41 that rotates the antenna (not shown) of a radar set. This cam 40 has a raised portion 42 that closes a normally open switch 43 when the antenna is pointed straight ahead along the axis of the ship or coincides with any other reference direction. The closing of the switch 43 completes the circuit from a source 44 of positive potential through a resistor 45. The resistor 45 is coupled to the grid 46 of a tube 47 through a capacitor 48. The plate 50 of this tube 47 is connected to a source 51 of positive potential through a resistor 52. The plate 50 is also coupled to the grid 53 of a second tube 54 through a resistor 55 and a capacitor 56 connected in series. The plate 50 of the tube 47 is connected to the cathode 57 of a diode 58, the plate 60 of which is connected to the capacitor 56 so that the diode 58 shunts the resistor 55. The cathode 61 of the tube 47 is connected to the cathode 62 of the tube 54 and is returned through resistors 63 and 64 to the grid of tube 47. The grid 53 of the tube 54 is connected to the source 51 of positive potential through a resistor 65. The plate 66 of the tube 54 is connected to the source 51 of positive potential through a resistor 67 and is coupled through a capacitor 68 to the control grid 70 of a cathode ray tube 71 that presents the radar information in P. P. I. form. The grid 70 is also coupled to a source of radar information over line 72. The cathode ray tube 71 is provided with horizontal and vertical deflection means, shown here as plates 73 and 74, respectively, which may be connected to appropriate deflection circuits for producing the P. P. I. display. The conection of the output of the multivibrator of the invention to the grid 70 of the cathode ray tube 71, together with radar information, has ben indicated schematically in the interests of simplicity. The details of the radar set, and the means for producing the display on the screen 77, form no part of the present invention. Many ways of presenting radar information in such a P. P. I. display are well known in the art.

In operation, when the switch 43 is closed by the cam 40, a positive pulse indicated by wave form 75 develops across the resistor 45 and is applied to the grid 46 on the normally nonconductive tube 47 of the multivibrator to produce a positive pulse indicated by the wave form 76 on the grid 70 of the cathode ray tube 71, causing a single bright radial line 77 to appear on the cathode ray tube face 78, as shown in Fig. 3, to indicate the direction of the ship's heading with respect to the radar information display. As pointed out above, a cam-operated switch, such as the switch 43, is likely to bounce or chatter and produce one or more spurious pulses, such as the pulses 80 and 81, shown occurring shortly after the main pulse 75. Such spurious pulses may retrigger the multivibrator to produce additional radial bright lines 82 and 83 on the face 78 of the cathode ray tube 71, in addition to the desired single bright line 77. With such spurious indications, the operator would not be able to clearly determine the ship's heading in relation to the other information on the face of the tube. When the multivibrator of the invention is used, its slow recovery time prevents more than the single pulse 77 appearing at the output of the multivibrator to be applied to the grid 70 of the cathode ray tube 71, with the result that only a single desired radial line 77 will appear on the face 78 of the cathode ray tube 71. A gating circuit, such as that described in the cited patent to Darden et al., can be added to assure the radial line beginning and ending coincident with a radial sweep of the cathode ray beam.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In an echo-ranging system having means for rotating a directive radiating and receiving means, and a cathode ray tube for the presentation of received signals, means for producing a mark on the screen of said cathode ray tube indicative of a predetermined direction relative to said system comprising a multivibrator having a first normally nonconducting and a second normally conducting electron discharge device each having a cathode, a grid and a plate, means to directly couple the plate of the normally nonconducting device to the grid of the normally conducting device comprising a capacitor and an impedance connected in series, and means for insuring that said direction indication be a single mark comprising means for disabling said mark-producing means for a predetermined time immediately following the generation of a single mark by said mark-producing means, said disabling means comprising a low impedance path for discharging the said capacitor and a high impedance path for charging the said capacitor.

2. In an echo-ranging system having means for rotating a directive radiating and receiving means, and a cathode ray tube for the presentation of received signals, means for producing a mark on the screen of said cathode ray tube indicative of a predetermined direction relative to said system comprising a multivibrator having a first normally nonconducting and a second normally conducting electron discharge device each having a cathode, a grid and a plate, means to directly couple the plate of the normally nonconducting device to the grid of the normally conducting device comprising a capacitor and an impedance connected in series, and means for insuring that said direction indication be a single mark comprising means for disabling said mark-producing means for a predetermined time immediately following the generation of a single mark by said mark-producing means, said disabling means comprising a rectifier connected across the said impedance in such polarity as to permit the rectifier and impedance to present a low impedance path for discharging the capacitor and a high impedance path for charging the said capacitor.

3. In a multivibrator having a normally nonconducting and a normally conducting electron discharge device each having a cathode, a grid and a plate, means to apply triggering pulses to the grid of the normally nonconducting device, means to directly couple the plate of the normally nonconducting device to the grid of the normally conducting device to cause it to cut off comprising a capacitor and an impedance connected in series, and means for delaying the recovery of said multivibrator for a predetermined time immediately following cutoff of said normally nonconducting device, said delaying device comprising a low impedance path for discharging the said capacitor and a high impedance path for charging the said capacitor.

4. In a multivibrator having a normally nonconducting and a normally conducting electron discharge device each having a cathode, a grid and a plate, means to apply triggering pulses to the grid of the normally nonconducting device, means to directly couple the plate of the normally nonconducting device to the grid of the normally conducting device to cause it to cut off comprising a capacitor and an impedance connected in series, and means for delaying the recovery of said multivibrator for a predetermined time immediately following cutoff of said normally nonconducting device, said delaying device comprising a rectifier connected across the said impedance in such polarity as to permit the rectifier and impedance to present a low impedance path for discharging the said capacitor and a high impedance path for charging the said capacitor.

References Cited in the file of this patent

UNITED STATES PATENTS

| 2,441,579 | Kenyon | May 18, 1948 |
| 2,489,269 | Cleeton | Nov. 29, 1949 |
| 2,517,635 | Darden et al. | Aug. 8, 1950 |

FOREIGN PATENTS

| 356,111 | Great Britain | Aug. 24, 1931 |

OTHER REFERENCES

Principles of Radar, M. I. T. Radar School Staff, second edition, 1946; McGraw-Hill Book Company, New York, pp. 2-53 to 2-58.